（12） United States Patent
Murashita et al.

(10) Patent No.: US 8,483,510 B2
(45) Date of Patent: Jul. 9, 2013

(54) IMAGE MERGE DEVICE AND METHOD

(75) Inventors: Kimitaka Murashita, Kawasaki (JP);
Masayoshi Shimizu, Kawasaki (JP);
Kaoru Chujo, Kawasaki (JP); Yasuhiro Kawakatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 12/721,219

(22) Filed: Mar. 10, 2010

(65) Prior Publication Data

US 2010/0166337 A1 Jul. 1, 2010

Related U.S. Application Data

(63) Continuation of application No. PCT/JP2007/001036, filed on Sep. 25, 2007.

(51) Int. Cl.
*G06K 9/32* (2006.01)
*H04N 1/387* (2006.01)

(52) U.S. Cl.
USPC .............. 382/284; 382/294; 358/453

(58) Field of Classification Search
USPC .......... 382/282, 283, 284, 287, 289, 291, 382/293, 294, 295; 348/584, 588; 345/629, 345/630, 635, 641; 358/450, 451, 453
See application file for complete search history.

(56) References Cited

U.S. PATENT DOCUMENTS

| | | | | |
|---|---|---|---|---|
| 5,721,624 A | * | 2/1998 | Kumashiro et al. | 358/450 |
| 5,986,668 A | * | 11/1999 | Szeliski et al. | 345/634 |
| 6,078,701 A | * | 6/2000 | Hsu et al. | 382/294 |
| 6,549,681 B1 | * | 4/2003 | Takiguchi et al. | 382/294 |
| 7,064,783 B2 | * | 6/2006 | Colavin et al. | 348/231.3 |
| 7,480,693 B2 | * | 1/2009 | Kaneko et al. | 709/201 |
| 7,508,996 B2 | * | 3/2009 | Matsumoto et al. | 382/284 |
| 7,535,499 B2 | * | 5/2009 | Takata et al. | 348/239 |
| 7,889,929 B2 | * | 2/2011 | Ashikaga | 382/195 |
| 2003/0007204 A1 | * | 1/2003 | Ashizaki et al. | 359/23 |

FOREIGN PATENT DOCUMENTS

| | | |
|---|---|---|
| JP | 9-93431 | 4/1997 |
| JP | 10-105677 | 4/1998 |
| JP | 2000-299804 | 10/2000 |

OTHER PUBLICATIONS

Hwang-Seok Oh; Heung-Kyu Lee; , "Adaptive adjustment of the search window for block-matching algorithm with variable block size," Consumer Electronics, IEEE Transactions on , vol. 44, No. 3, pp. 659-666, Aug. 1998.*
International Search Report for PCT/JP2007/001036, mailed Nov. 27, 2007.

* cited by examiner

*Primary Examiner* — Andrae S Allison
(74) *Attorney, Agent, or Firm* — Fujitsu Patent Center

(57) ABSTRACT

The image merge device includes a common area determination unit configured to determine a common area between a first image and a second image; a correlation calculation unit configured to calculate a correlation level indicating a degree of a gap between the first image near a boundary of the first image and the second image and the second image near the boundary when the first image and the second image are aligned using the common area; and a superimposed area determination unit configured to determine a superimposed area in which the first and second images are superimposed near the boundary based on the correlation level calculated by the correlation calculation unit.

17 Claims, 19 Drawing Sheets

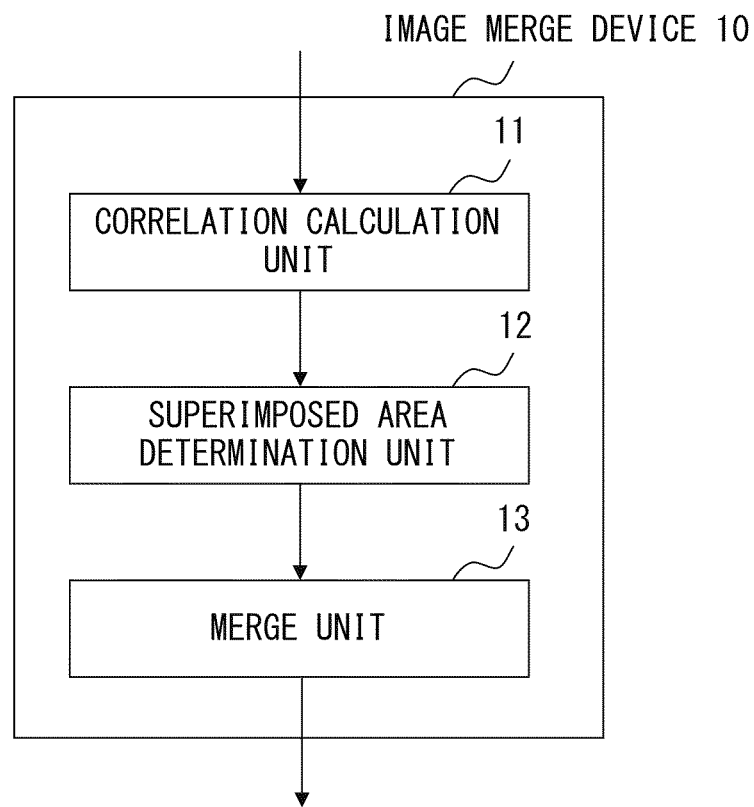
F I G. 1

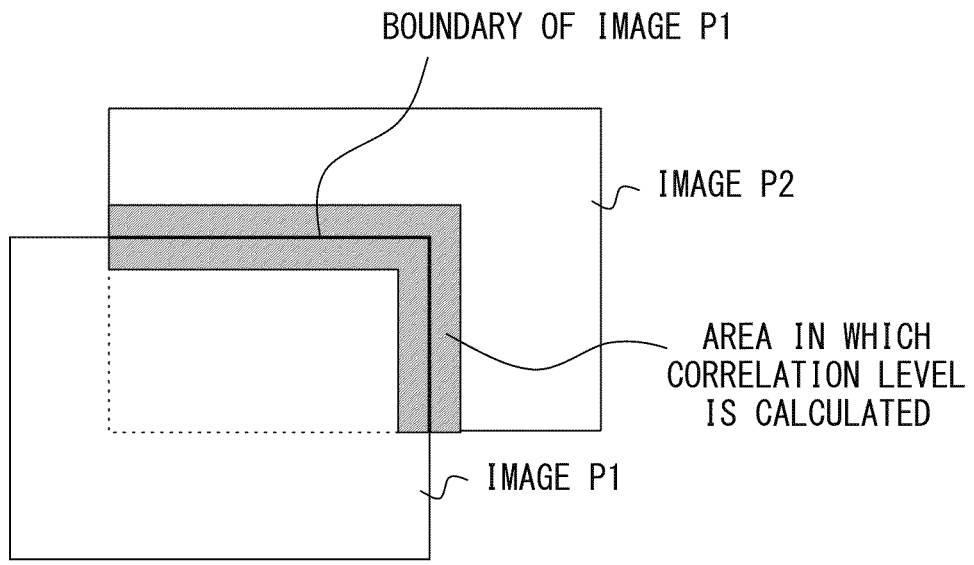
F I G. 5A
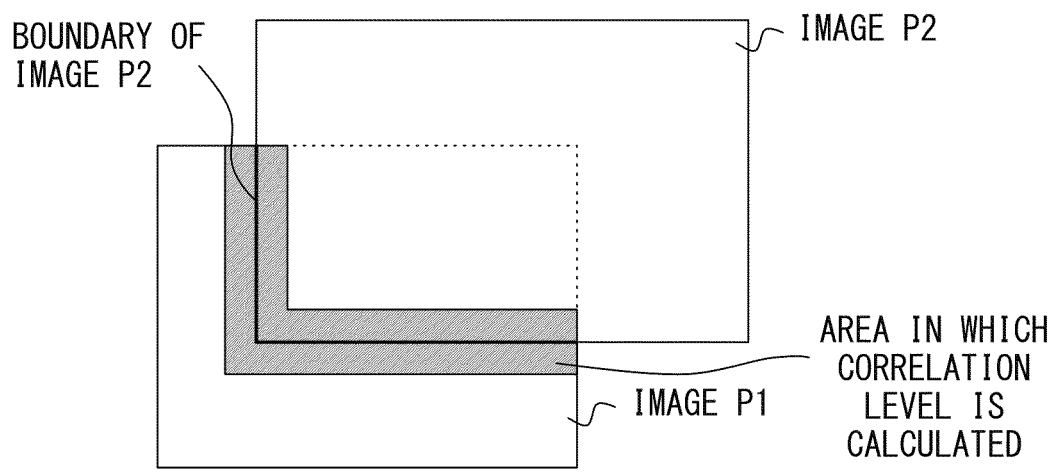
F I G. 5B

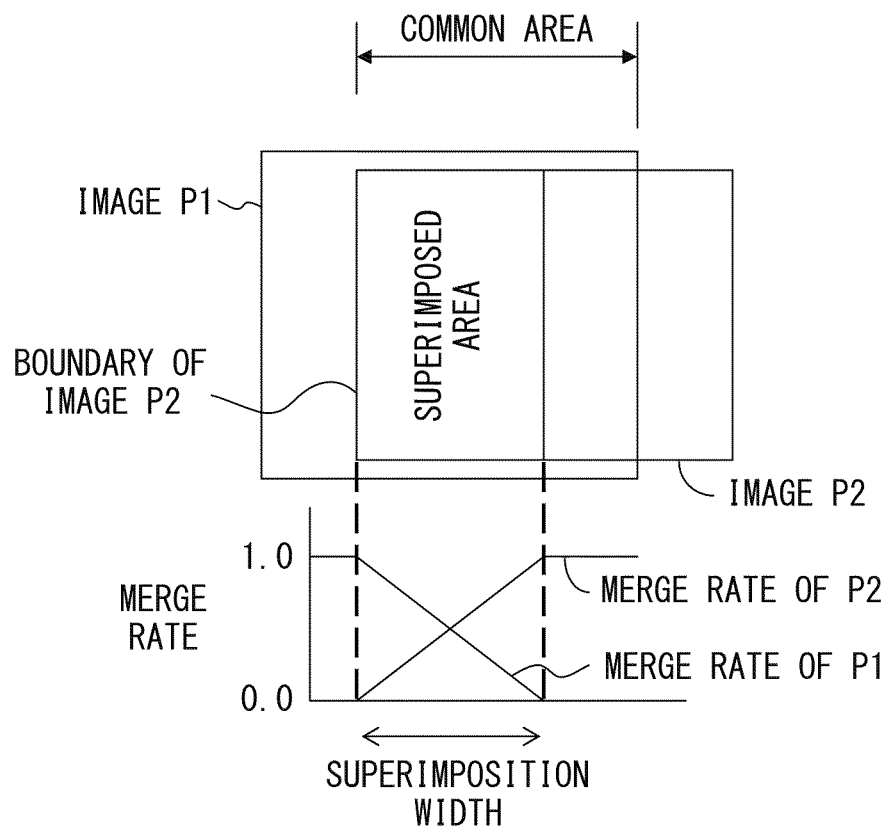
F I G. 10

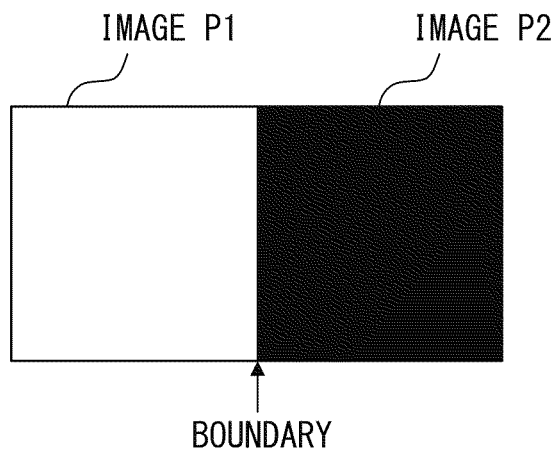
F I G. 1 1 A
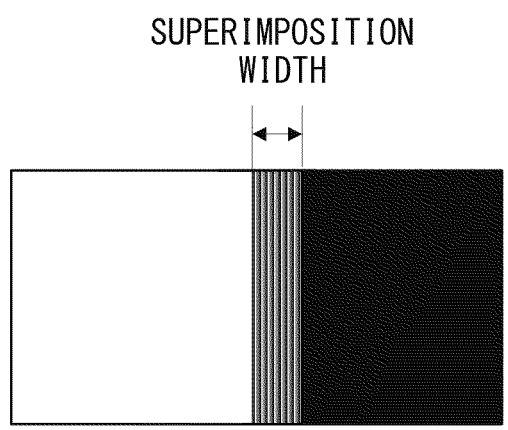
F I G. 1 1 B
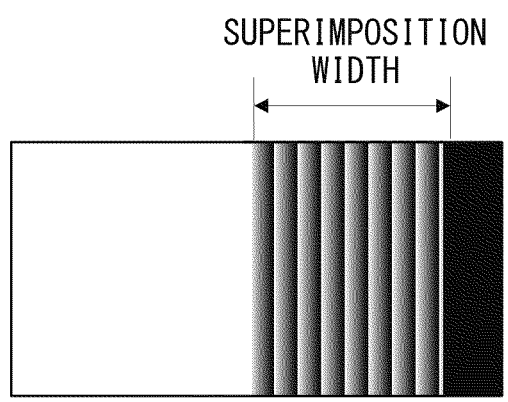
F I G. 1 1 C

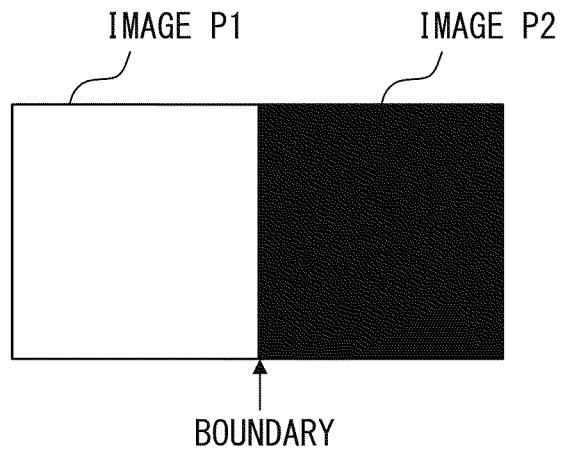
F I G. 1 2 A
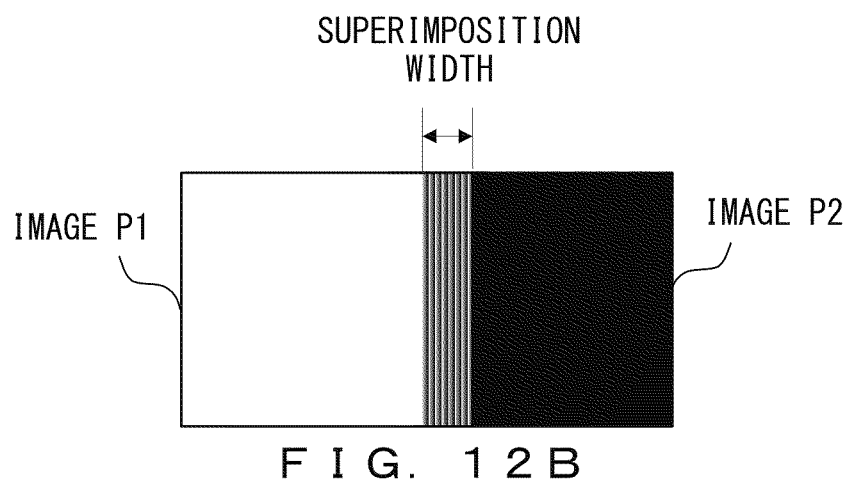
F I G. 1 2 B
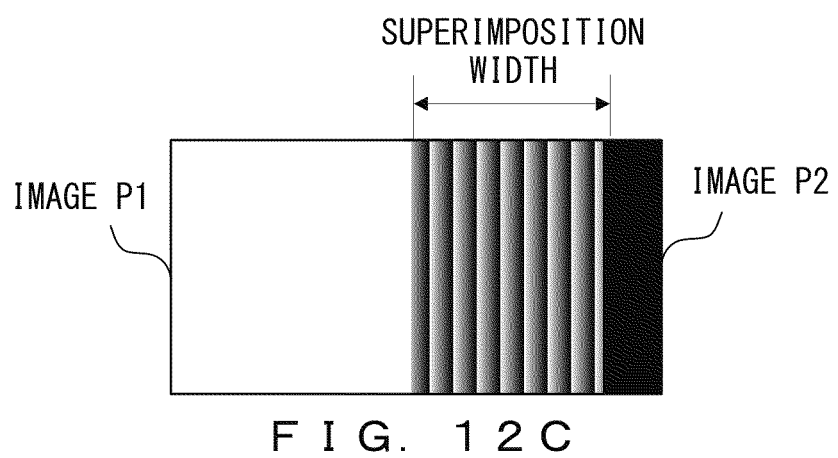
F I G. 1 2 C

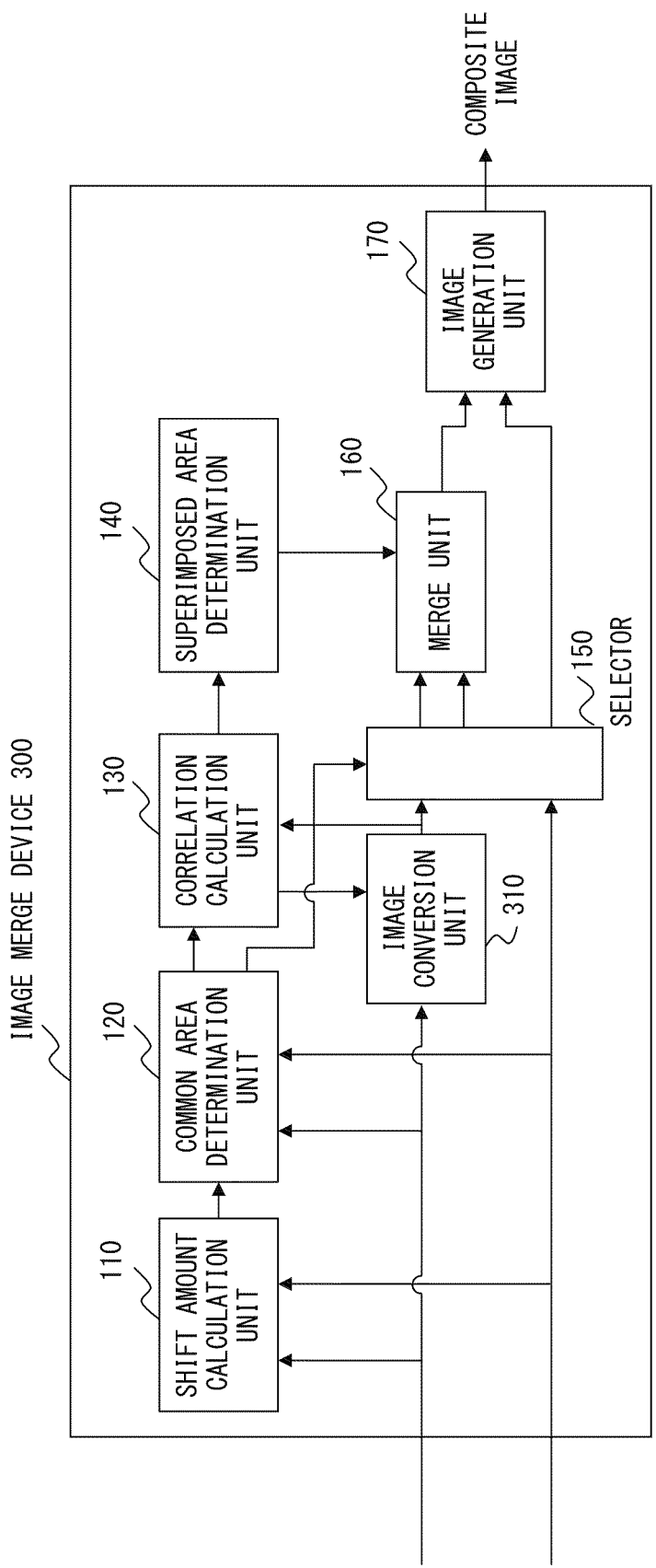
F I G. 1 4

| DIFFERENCE OF Y COMPONENT | DARKER IMAGE | BRIGHTER IMAGE |
|---|---|---|
| 10 | 0.9 | 1.2 |
| 20 | 0.8 | 1.3 |
| 30 | 0.7 | 1.4 |
| 40 | 0.6 | 1.5 |
| 50 | 0.5 | 1.6 |

F I G. 1 8

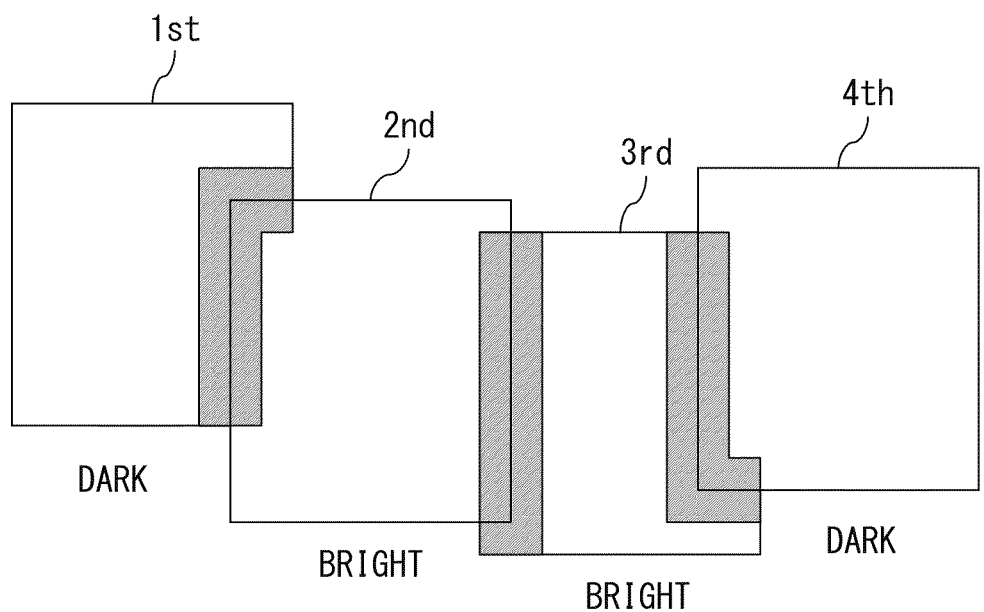
F I G. 19

IMAGE MERGE DEVICE AND METHOD

CROSS-REFERENCE TO RELATED APPLICATIONS

This application is a continuation of international application PCT/JP2007/001036, which was filed on Sep. 25, 2007, the entire contents of which are incorporated herein by reference.

FIELD

The present invention relates to a method and a device for merging a plurality of images.

BACKGROUND

When an image is obtained by combining a plurality of images, an overlapping or common area between a plurality of images to be combined is set as an "overlapping area" (hereinafter an overlapping area is referred to as a common area). The relative positions between the plurality of images are calculated, and the positions of the plurality of images are aligned based on the relative positions. A composite image is generated by merging the plurality of images after the alignment. However, since the plurality of images are obtained at different timing with different quantity of light due to camera angle and so on, there occurs an unnatural break at the boundary of merged images (joint of images).

Therefore, a plurality of images are superimposed near the boundary (hereinafter referred to as a superimposed area) and merged in such a way that the boundary looks natural. Accordingly, the resultant composite image includes an area generated from only one image and an area generated by superposing a plurality of images.

When a moving object is shot by a camera and the moving object exists in a superimposed area in the composite image, there may be ghost images (two or more shifted images) of the moving object in the superimposed area. Therefore, it is desired that the superimposed area is smaller. However, when there are large gaps between a plurality of images to be merged, and the superimposed area is very small, the discontinuity at the boundary due to the gaps between the plurality of images cannot be suppressed.

To solve the above-mentioned problem, a method in which the width of a superimposed area may be selected by a user of a digital camera is proposed. This method is proposed, for example, by Japanese Laid-open Patent Publication No. 2000-299804.

However, the proposed method requires an operation by a camera user, and the operation is complicated. Thus, the quality of an image depends on the experience or technique of the camera user. In addition, since the width of the superimposed area is selected in advance, the composite image sometimes has a discontinuity at the boundary of a plurality of images.

SUMMARY

According to an aspect of an invention, the image merge device, which merges a first image and a second image, includes a common area determination unit configured to determine a common area between the first image and the second image; a correlation calculation unit configured to calculate a correlation level indicating a degree of a gap between the first image near a boundary of the first image and the second image and the second image near the boundary when the first image and the second image are aligned using the common area; and a superimposed area determination unit configured to determine a superimposed area in which the first and second images are superimposed near the boundary based on the correlation level calculated by the correlation calculation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the image merge device according to the embodiments;

FIGS. 5A and 5B are explanatory views of an area for which a correlation level is calculated;

FIG. 10 is an explanatory view of a method in which the merge rate is changed depending on the distance from the boundary;

FIG. 11A through 11C are explanatory views of the vicinity of the boundary when the gap between the images is large;

FIG. 12A through 12C are explanatory views of the vicinity of the boundary when the gap between the images is small;

FIG. 14 is a configuration of the image merge device according to the third embodiment;

FIG. 18 is an example of a correspondence chart between the difference of Y component and gamma correction curve; and FIG. 19 is an explanatory view of a method in which a number of images are combined.

DESCRIPTION OF EMBODIMENTS

Figure 2:
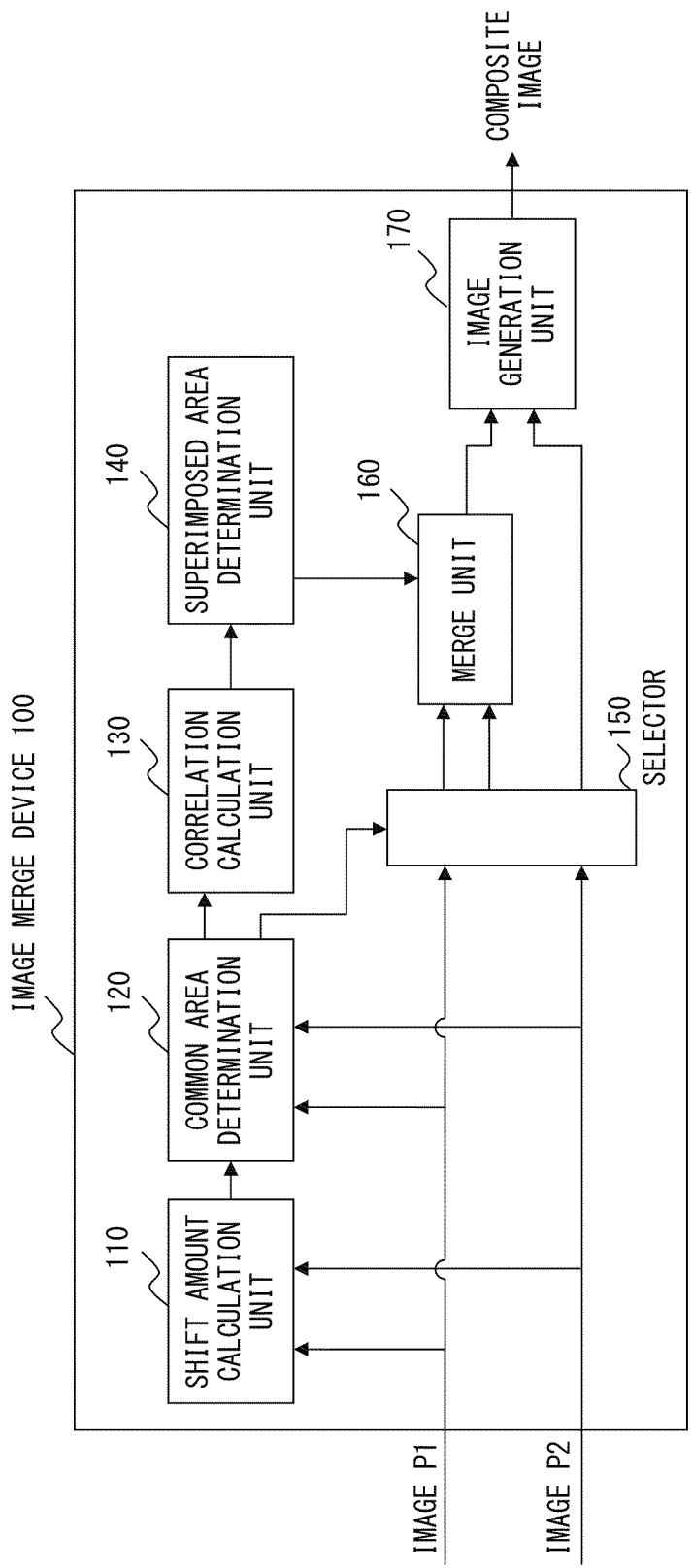
FIG. 2 is a configuration of the image merge device according to the first embodiment.

The embodiments of the present invention are described below with reference to the attached drawings. These embodiments are described fully in detail so that they can be realized by those skilled in the art, but other embodiments are also available. For example, changes in configuration, logic, and electrical circuit to an embodiment may be made within the scope of the subject of the present invention. Therefore, the following descriptions are not to be restrictively understood, but the scope of the subject of the invention is to be defined by the scope of the claims of the patent and their equivalences.

Furthermore, the functions of the device described below may be realized by software, hardware, firmware, and their optional combinations. The examples described below may have a single function or a combination of functions for each unit, and other combinations of functions may also be realized within the scope of the subject of the present invention.

FIG. 1 illustrates an image merge device of the embodiments. As illustrated in FIG. 1, an image merge device 10 according to the embodiments includes: a correlation calculation unit 11 for calculating the correlation level indicating the degree or level of the gap between a plurality of images; a superimposed area determination unit 12 for determining a superimposed area in which the plurality of images are superimposed according to the correlation level; and a merge unit 13 (or image generation unit) for merging the plurality of images by superimposing the images in the superimposed area.

When a plurality of aligned images are input, the correlation calculation unit 11 calculates the correlation level indicating the degree indicating the gap between the plurality of images near the boundary where the plurality of images are to be combined. To be more practical, the correlation calculation unit 11 acquires a pixel near the boundary from each of the plurality of images, calculates the statistics of the pixel values of each image, and calculates the correlation level based on the statistics. The higher the degree of similarity between the images is, that is, the smaller the gap between the images is, the higher the correlation level calculated by the correlation calculation unit 11 becomes.

The vicinity of the boundary of the joint refers to the area within a certain width in the plurality of images from the boundary. Therefore, a high correlation level indicates no large gap between the plurality of images near the boundary.

The statistics of pixel values used in calculating the correlation level may be at least one of the difference between the brightness, chroma or saturation, color temperature, and pixel value. In addition, the statistics may be an average, maximum, cumulative sum, standard deviation or dispersion of them.

For example, when the correlation level is calculated based on the brightness, a high correlation level indicates a small cap in brightness between the plurality of images near the boundary.

The superimposed area determination unit 12 determines an area in which the images are superimposed near the boundary of the joint. The merge unit 13 (or image generation unit) combines and merges the plurality of images by superimposing the plurality of images in the superimposed area.

When a plurality of images are combined and edge areas of the images are superimposed at the boundary, the boundary can be blurred. However, if the superimposed area in which the images are superimposed is fixed, the superimposed area may be too large or small depending on the gap between the images. For example, if the superimposed area is fixed when the gap between images are sufficiently small, the superimposed area is too large, and ghost images of an object may be generated in the superimposed area. On the other hand, if the superimposed area is fixed when the gap between the images is large, the superimposed area is too small and it may not be possible to solve the problem of discontinuity at the boundary.

The image merge device 10 according to the embodiments avoids the ghost images in the superimposed area while reserving a necessary superimposed area to suppress the gap between the images by determining a superimposed area based on the correlation level. That is, when the gap between the images is sufficiently small, the superimposed area determination unit 12 avoids the ghost images in the superimposed area by reducing the superimposed area. When the gap between the images is large, the superimposed area determination unit 12 eliminates the discontinuity occurring at the boundary of the joint by enlarging the superimposed area.

Since the superimposed area determination unit 12 determines the superimposed area based on the plurality of combined images, it is not necessary for a camera user to set the superimposed area before shooting an image. Therefore, the quality of an image does not depend on the experience of a camera user or the shooting technique. In addition, since the superimposed area is determined with respect to the obtained images, not determined in advance, the problem that the superimposed area proves to be inappropriate after practically shooting an image does not occur.

In addition, the merge rate of a plurality of image may be changed depending on the distances from the boundary. According to this method, since a plurality of images are smoothly merged in the superimposed area, it is possible to blur the boundary more effectively.

In addition to the above-mentioned configuration, the image merge device 10 may be provided with an image conversion unit for comparing the correlation level with a predetermined value, and converting at least one of a plurality of images to be merged based on a result of the comparison. In this case, the image conversion unit converts at least one of the plurality of images so that the correlation level between the plurality of images is high. That is, the image conversion unit converts an image so that the gap between a plurality of images become small.

According to this configuration, when the gap between the images is large, the images is not only superimposed, but also converted so that the gap between the images become small in an area near the boundary, thereby further blurring the boundary of the joint.

The image conversion unit may convert the vicinity of the boundary of the image to be converted. If the entire images are converted when a number of images are merged, the images may be largely different from the original images. According to the above configuration, the problem is overcome by limiting the range of the conversion to the vicinity of the boundary.

The image conversion unit may compare the correlation level between the plurality of converted image with a predetermined value, and repeat the conversion until a comparison result satisfies a predetermined condition. In this case, the image conversion unit may repeat the conversion until the correlation level between the plurality of converted images becomes smaller than a predetermined value. Thus, the boundary of the joint becomes furthermore blurred.

In addition, the image synthesis device 10 may be further provided with a shift amount calculation unit for calculating the amount of shift of a plurality of images, and a common area determination unit for aligning the plurality of images based on the calculated amount of shift, and determining the area overlapping between the plurality of images as a common area. According to this configuration, a plurality of image for which alignment and common area are not set in advance may be merged.

Furthermore, the image merge device 10 may be provided for an image shooting device, such as a digital camera or an electronic camera, and so on. The image shooting device having the image merge device may be provided for a mobile telephone terminal, a PDA (personal digital assistant), a personal computer, etc.

A method including the processes performed by corresponding units provided in the image merge device 10 also relates to the embodiments of the present invention, and the method may attain the above-mentioned objectives.

In addition, a program used to direct a processor to perform control similar to the functions of corresponding unit provided in the image merge device 10, a record medium recording the program, and a program product are also related to the embodiments of the present invention. The above-mentioned objects may also be attained by allowing a processor to read the program and control various interfaces etc. connected thereto based on the program.

The following description is made by assuming that two images are merged. The assumption is made for easy explanation, and two or more images may also be merged. Furthermore, the images are described as rectangular images, but may also be in any forms other than rectangles.

Described below is the image merge device according to the first embodiment. An image merge device 100 according to the first embodiment determines a superimposed area by considering the gap between the images near the boundary at which the images are combined, and merges two images by superimposing the two images in the superimposed area.

FIG. 2 is a configuration of the image merge device 100 according to the first embodiment. As illustrated in FIG. 2, the image merge device 100 includes a shift amount calculation unit 110, a common area determination unit 120, a correlation calculation unit 130, a superimposed area determination unit 140, a selector 150, a merge unit 160, and an image generation unit 170.

The shift amount calculation unit 110 receives images P1 and P2 to be combined. The shift amount calculation unit 110 calculates an amount of shift by matching corresponding pixels of the images P1 and P2. The common area determination unit 120 aligns the images P1 and P2 based on the calculated amount of shift, and determines the overlapping area of the two images as a common area. The correlation calculation unit 130 calculates the correlation level indicating the degree of the gap between the images P1 and P2 near the boundary of the common area based on of the pixels of the images P1 and P2. The superimposed area determination unit 140 determines a superimposed area as an area in which the images P1 and P2 are to be superimposed based on the calculated correlation level. The selector 150 outputs the pixels in the input images P1 and P2 to the merge unit 160 or the image generation unit 170. The merge unit 160 merges the pixels of the images P1 and P2, and outputs the resultant pixels to the image generation unit 170. The image generation unit 170 generates an image after the merge processing (hereinafter referred to as a composite image) from the pixels output from the selector 150 and the merge unit 160, and outputs the image.

Figure 3:
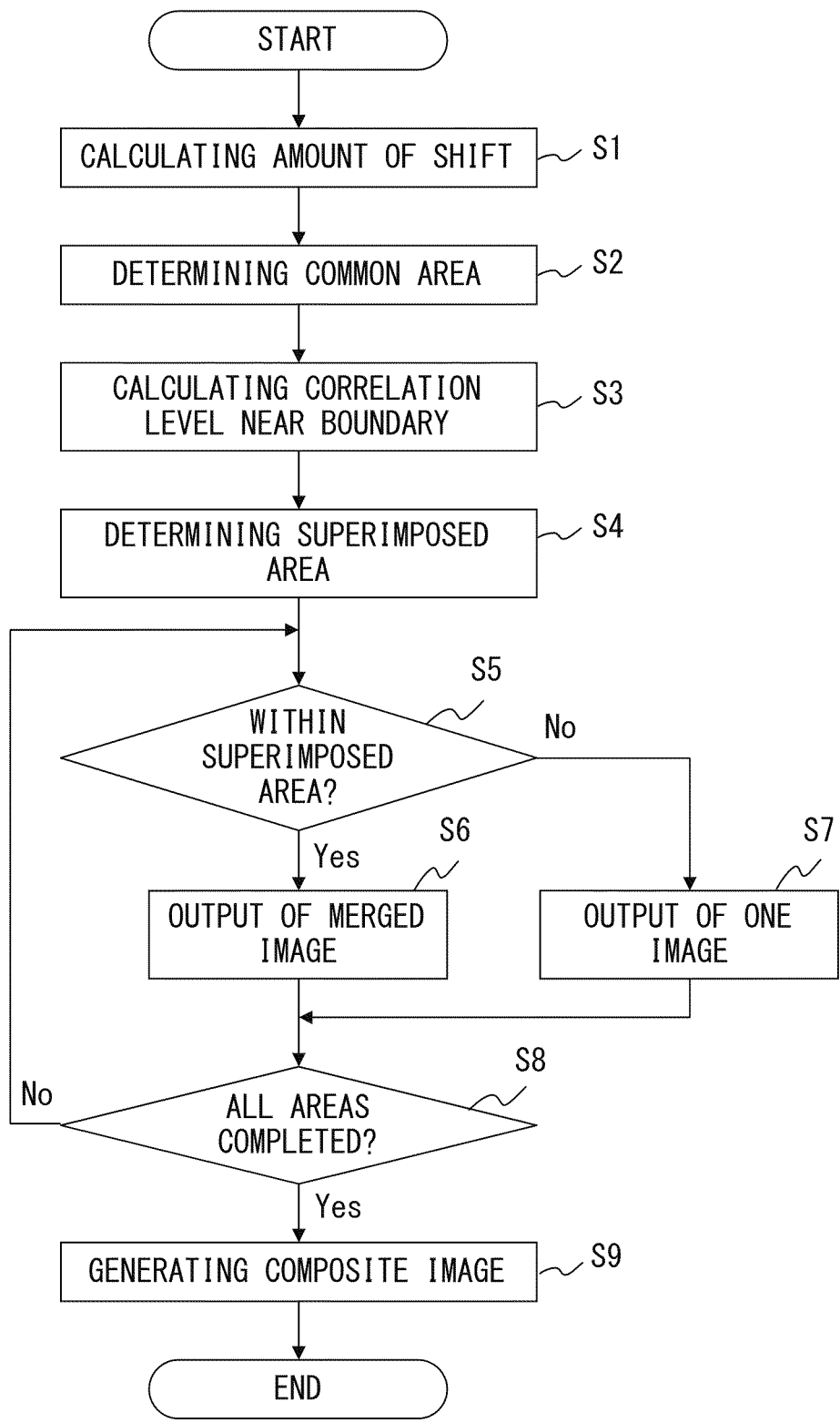
FIG. 3 is a flowchart of the process performed by the image merge device according to the first embodiment.

The flow of the process performed by the image merge device 100 is described below with reference to FIG. 3.

First, the shift amount calculation unit 110 calculates the amount of shift by matching corresponding pixels of the images P1 and P2 (step S1). The common area determination unit 120 performs an alignment by converting coordinates of the image P1 or P2 so that there is no shift between the images according to the calculated amount of shift. Furthermore, the common area determination unit 120 determines the overlapping area between the two aligned images as a common area (step S2).

The correlation calculation unit 130 calculates the correlation level near the boundary of a common area (step S3). To be more practical, the correlation calculation unit 130 retrieves a pixel near the boundary from each of the images P1 and P2 according to the coordinate information of the pixel, calculates the statistics about the pixels, and calculates the correlation level based on the statistics. There are various calculating methods about the correlation level. For example, there are calculating methods using the statistics of the brightness, the statistics of the chroma, the statistics of the color temperature, and/or the statistics of the difference between pixel values. When the statistics of the brightness, the chroma and/or color temperature are used, for example, an average value, a standard deviation, a dispersion, etc. of them may be used. When the statistics of the difference between the pixel values is used in a calculating method, the statistics may be an average, a maximum, a cumulative sum, a standard deviation, a dispersion, etc.

Then, the superimposed area determination unit 140 determines the superimposed area based on the calculated correlation level. To be more practical, the superimposed area determination unit 140 determines a small superimposed area when the correlation level calculated by the correlation calculation unit 130 is high, and determines a large superimposed area when the calculated correlation level is low (step S4).

The selector 150 determines according to the determined superimposed area and the coordinate information about the pixels of the images P1 and P2 whether or not each pixel is in the superimposed area of the merged images (step S5). If it is determined that a pixel is within the superimposed area (YES in step S5), the selector 150 outputs the pixel with its coordinate information to the merge unit 160. The merge unit 160 merges the relevant pixel of the image P1 and the pixel of the image P2 in the position corresponding to the relevant pixel of the image P1, and outputs the pixel obtained as a result of the merge process together with the coordinate information about the merged image. The merge rate of the images P1 and P2 may be an arbitrary constant or a variable (step S6). On the other hand, when it is determined that a pixel is not in the superimposed area, the selector 150 outputs the pixel as is together with the coordinate information about the pixel to the image generation unit 170 (step S7). If a pixel is in the common area but not in the superimposed area, and there are pixels of the images P1 and P2, then the selector 150 outputs a pixel of one of the images and the coordinate information about the composite image.

If the above-mentioned processes are performed on the entire area of the images P1 and P2 (YES in step S8), the image generation unit 170 generates an composite image according to the pixels and the coordinate information output from the selector 150 and the merge unit 160 (step S9).

Figure 4:
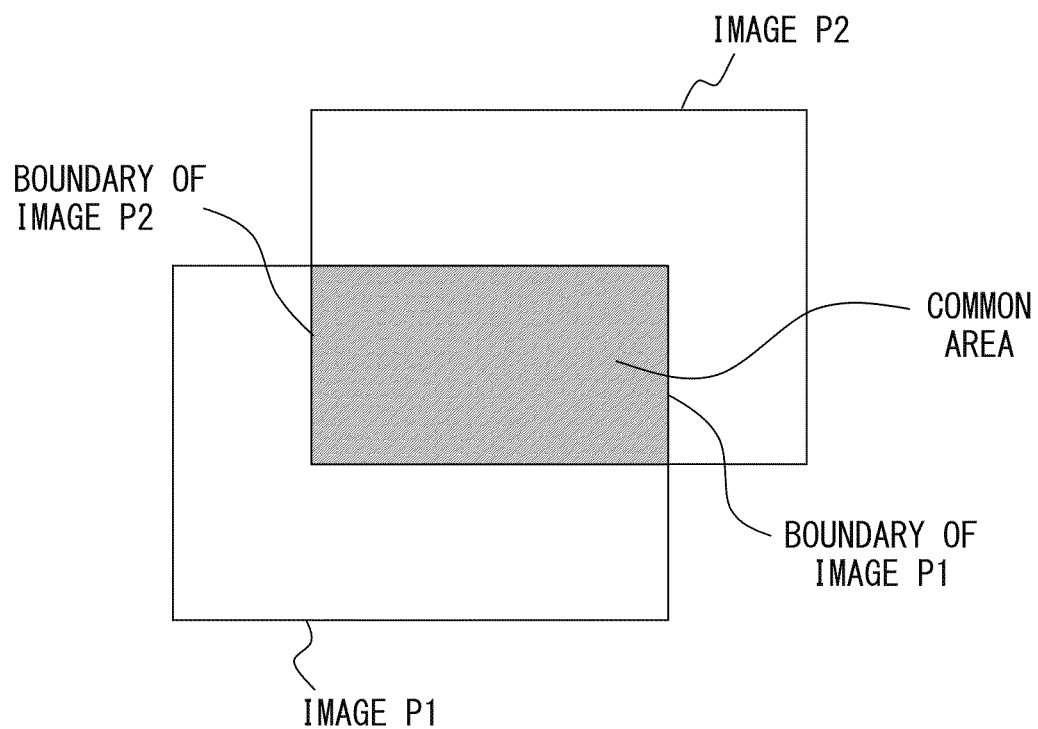
FIG. 4 is an explanatory view of a common area when two images are shifted in the 2-dimensional direction.

The area near the boundary about which the correlation level is calculated is described below with reference to FIGS. 4, 5A and 5B. FIG. 4 illustrates the common area and the vicinity of the boundary when the images P1 and P2 to be merged are shifted vertically and horizontally. The common area is an overlapping area between the images P1 and P2, and is represented by diagonal lines in FIG. 4. The common area is a rectangle enclosed by a part of the periphery of the image P1 and a part of the periphery of the image P2. Hereinafter, in each side of the common area, the two sides configured by a part of the periphery of the image P1 are referred to as the boundary of the image P1, and the two sides configured by a part of the periphery of the image P2 are referred to as the boundary of the image P2.

When two images are merged, the image P1 or the image P2 is used in the common area as described below with reference to FIGS. 5A and 5B. As illustrated in FIGS. 5A and 5B, the boundary of the image used in the common area appears on the composite image, and the boundary of the image not used in the common area is hidden behind the composite image. It is not necessary to calculate the correlation level about the vicinity of the hidden boundary. Therefore, the area for which the correlation calculation unit 130 calculates the correlation level is several pixels distant from the boundary of the image used in the common area. In FIGS. 5A and 5B, the area represented by the diagonal lines is an area for which the correlation level is calculated.

That is, when the image P1 is used in the common area, the boundary of the image P1 appears on the composite image as illustrated in FIG. 5A, and the area within a range inward and outward the common area from the boundary of the image P1 is selected as an area for which the correlation level is calculated. Similarly, when the image P2 is used in the common area, the area within a range inward and outward the common area from the boundary of the image P2 is selected as an area for which the correlation level is calculated as illustrated in FIG. 5B. The width of the area near the boundary may be within several percent through 20 percent of the entire width of an image.

Next, the calculation of the correlation level is described below in detail. The correlation calculation unit 130 calculates the correlation level using the statistics of pixel values such as the statistics of the brightness, the statistics of the chroma, the statistics of the color temperature, the statistics of the difference between pixel values etc.

For example, the case in which an average of brightness is used to calculate the correlation level is described below. In this example, the YCbCr color space or the YPbPr color space frequently used in TV etc. are used. In these color spaces, the brightness is represented by Y component. It is only an example, and there are various color spaces depending on the devices, and any color space may be applied in the similar method.

First, the correlation calculation unit 130 acquires pixels located near the boundary of the common area from each of the images P1 and P2, and calculates an average of the Y component of the pixels from the image P1, and an average of the Y component of the pixels from the image P2. Furthermore, the correlation calculation unit 130 calculates the difference between the average values of the Y values. Then, the correlation calculation unit 130 may define the reciprocal of the "absolute value of the difference+1", or the reciprocal of a value obtained by dividing the "absolute value of the difference+1" by the "gray scale level (in many cases, the Y component is represented by 256 levels from 0 to 255)" as the correlation level. As another example to calculate the correlation level, the case in which the average of the lightness in the HSB (Hue saturation brightness) color space (HSV (Hue saturation value) color space) is used is described below. It is obvious that this is an example only. In this case, the correlation calculation unit 130 acquires pixels located near the boundary of the common area from each of the images P1 and P2, and calculates the average value of the lightness of the pixels from the image P1 and the average value of the lightness of the pixels from the image P2. Furthermore, the correlation calculation unit 130 calculates the difference between the two obtained average values of the lightness. The correlation level may be a reciprocal of the "absolute value of the difference+1". Similarly when another statistics is used, the correlation calculation unit 130 calculates the statistics for each of the pixels from the vicinity of the boundary of the image P1 and the vicinity of the boundary of the image P2, and calculates the correlation level based on the statistics. In this case, the correlation calculation unit 130 calculates the correlation level so that the higher similarity of the vicinities of the boundaries of the images P1 and P2 are indicated by the statistics, the higher correlation level is attained. That is, the smaller the gap between the images in the area near the boundaries, the higher the correlation level.

Figure 6A:
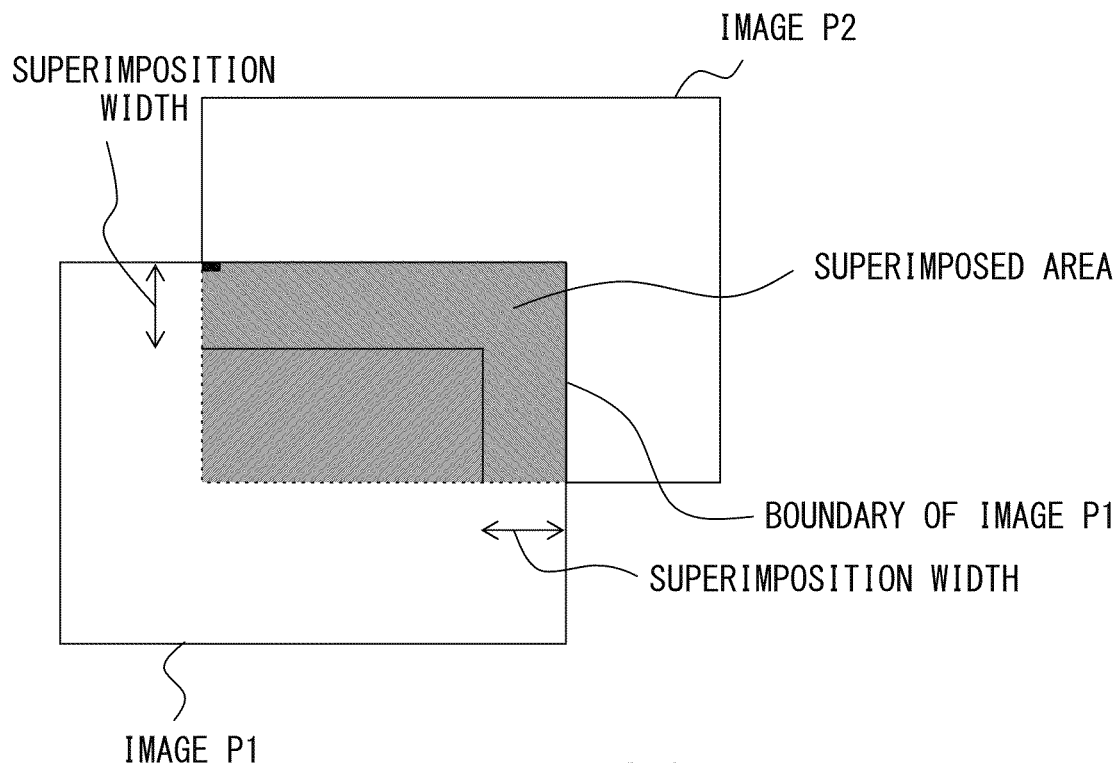
FIGS. 6A and 6B are explanatory views of a superimposed area.
Figure 6B:
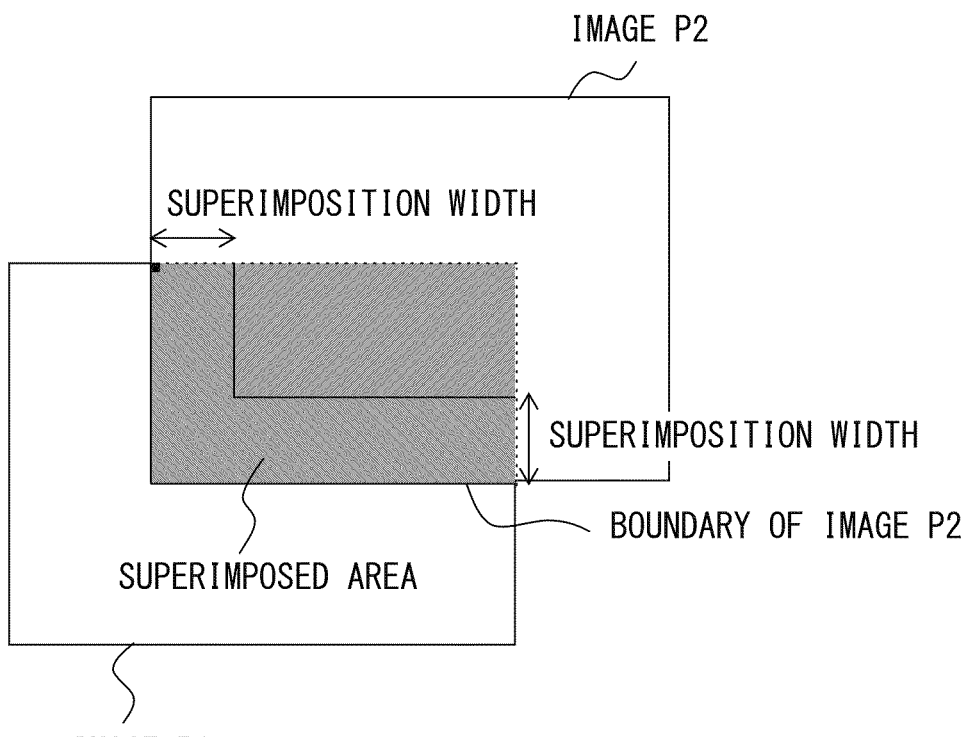

When the correlation level is calculated, the superimposed area determination unit 140 determines a superimposed area. With reference to FIGS. 6A and 6B, the superimposed area is described.

FIGS. 6A and 6B illustrate the superimposed areas when the images P1 and P2 are shifted from each other in vertical direction and horizontal direction. A common area is an area in which the images P1 and P2 overlap each other, and the common area is represented by the diagonal lines in FIGS. 6A and 6B. The superimposed area is a part of the common area, and represented by the shaded area in FIGS. 6A and 6B. The shape of the superimposed area is like a 'hook" in this example. When the image P1 is used in the common area, the boundary of the image P1 appears in the composite image as illustrated in FIG. 6A, and the area in the common area within a certain distance from the boundary of the image P1 is determined as the superimposed area. Similarly, when the image P2 is used in the common area, the area in the common area within a certain distance from the boundary of the image P2 is determined as the superimposed area as illustrated in FIG. 6B. The width of the superimposed area may be in the several percent to 20 percent of the entire width of the common area.

Next, the determination of the superimposed area by the superimposed area determination unit 140 is described below. When the calculated correlation level is high, the superimposed area determination unit 140 determines a small superimposition range, and when the correlation level is low, it determines a large superimposition range.

That is, when the correlation level is high, the gap between the images near the boundary is small. Therefore, the boundary of the common area between the images P1 and P2 is not outstanding. Accordingly, an unnatural break hardly occurs at the boundary when the two images are merged. Therefore, the superimposed area determination unit 140 provides a narrow superimposed area to avoid ghosts in the superimposed area. On the other hand, when the correlation level is low, the gap between the images at the boundary is large. Accordingly, there occurs an unnatural break at the boundary when the two images are merged. Therefore, the superimposed area determination unit 140 provides a broad superimposed area, thereby solving the problem of the discontinuity near the boundary.

Thus, the image merge device 100 determines the superimposed area depending on the gap near the boundary of the two images to be merged, thereby solving the problem of discontinuity near the boundary while avoiding ghosts in the superimposed area.

Even when the correlation level is very high, if the superimposed area, that is, the superimposition width, is too small, there may be a discontinuity at the boundary. In addition, a superimposition width exceeding the common area cannot be set (refer to FIGS. 6A and 6B). Therefore, with the above-mentioned considerations taken into account, the superimposed area determination unit 140 may be assigned the maximum value and the minimum value of the superimposition width. For example, the maximum value of the superimposition width may be set based on the determination of the common area by the common area determination unit 120.

Figure 7:
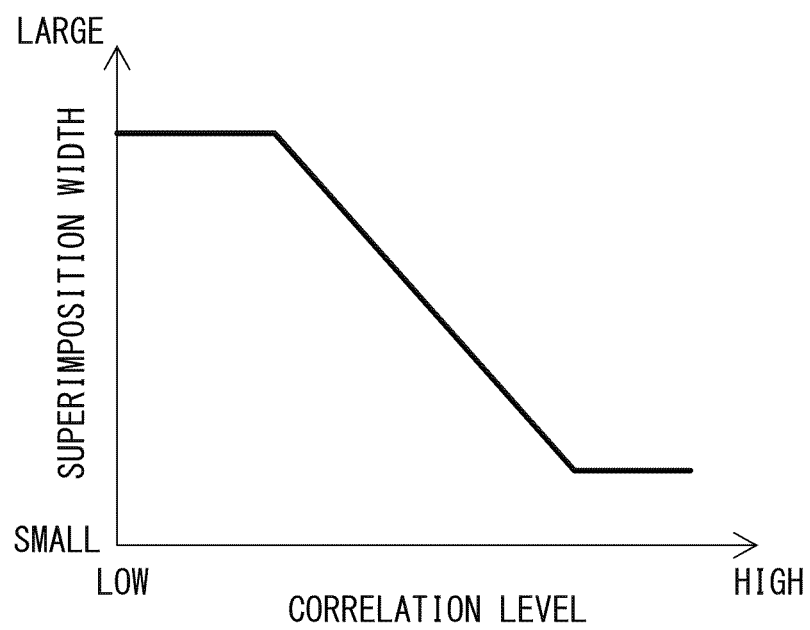
FIG. 7 is an example of the superimposition width determination function.

Furthermore, the superimposed area determination unit 140 may use a superimposition width determination function illustrated in FIG. 7. In this case, the superimposed area determination unit 140 may determine the superimposition width within a range from the minimum value and the maximum value according to the function.

In one example, when the correlation level is calculated using the brightness, that is, the Y component in the YCbCr color space or the YPbPr color space, the value which is obtained by dividing the absolute value of the difference between the average values of the Y component by 255 is calculated. In this case, when the calculated value is about 10 percent, it is considered that the gap between the images is large. If the value is about 4 percent, it is considered that the gap between the images is sufficiently small. Therefore, the superimposed area determination unit 140 may provide the maximum superimposition width when the calculated value is higher than 10 percent. Then, the superimposed area determination unit 140 may gradually decrease the superimposition width as the calculated value decreases, and provide the minimum superimposition width when the calculated value is lower than 4 percent.

In addition, for example, when the correlation level is calculated using a color temperature, the absolute value of the difference in color temperature is acquired in the process of calculating the correlation level. In this case, when the value is about 1500 kelvins, it may be considered that the gap between the images is large. Therefore, the maximum superimposition width is used when the calculated value is 1500 kelvins or more. On the other hand, when the calculated value is about 300 kelvins, it may be considered that the gap between the images is sufficiently small. Therefore, the minimum superimposition width is used when the calculated value is 300 kelvins or less.

The maximum value and the minimum value of the superimposition width may depend on a policy to improve the quality of the composite image. That is, when the solution to remove the discontinuity is highly considered, it is desired that relatively large values are used for the maximum value and the minimum value. On the other hand, when the solution to remove the ghosts is highly considered, it is desired that relatively small values are used for the maximum value and the minimum value.

A plurality sets of the maximum value and the minimum value may be prepared in advance in the superimposed area determination unit 140. In this case, the user may select one set of the maximum value and the minimum value. For example, if avoiding the discontinuity is more important than ghosts for the user, the user may select relatively large maximum and minimum values. Thus, a user-requested superimposition width, that is, superimposed area, may be determined.

Next, the image merge device according to the second embodiment is described below. An image merge device 200 according to the second embodiment has the function of changing the merge rate used in superposing two images in the superimposition area.

Figure 8:
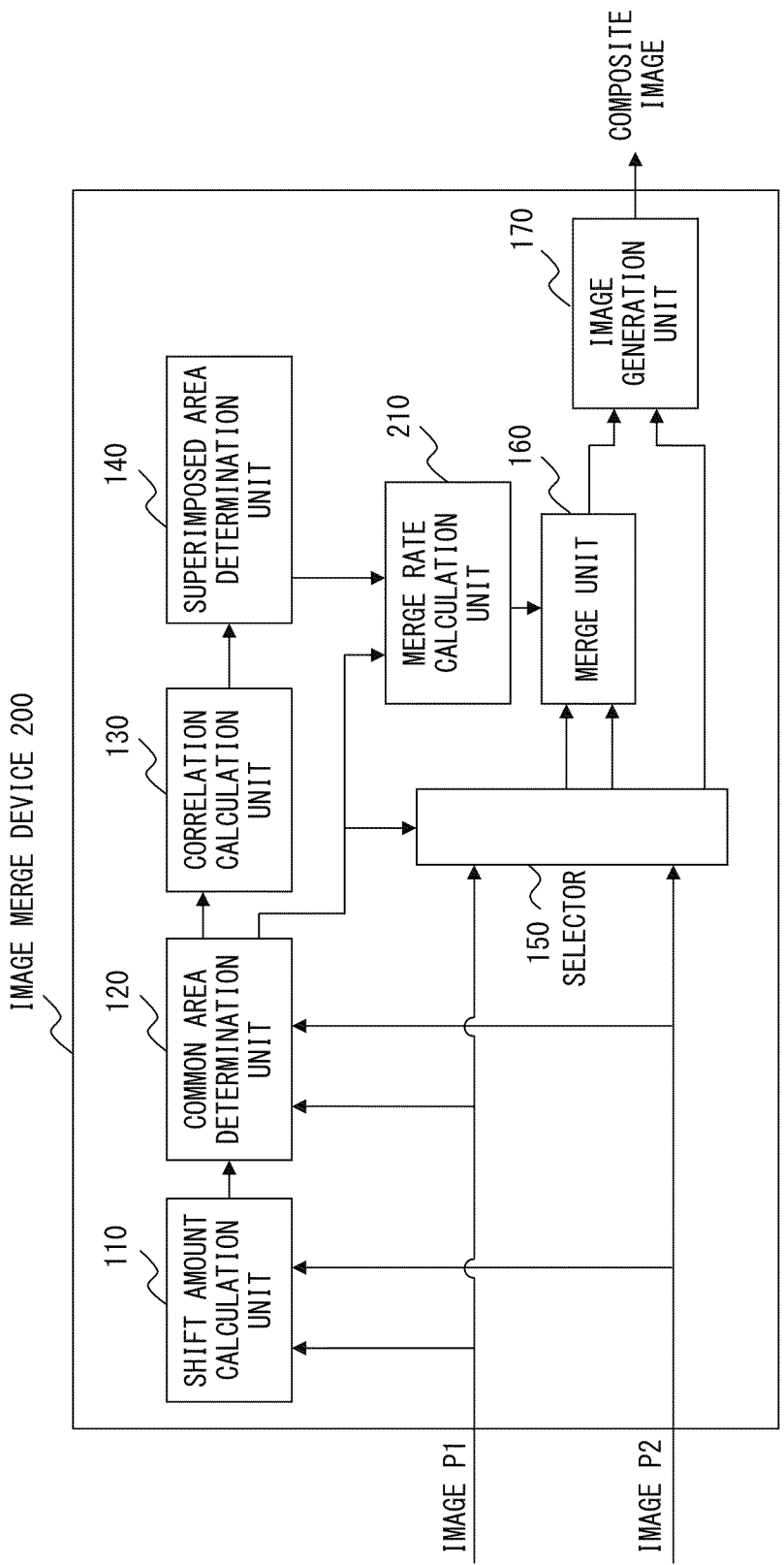
FIG. 8 is a configuration of the image merge device according to the second embodiment.

FIG. 8 is the configuration of the image merge device 200 according to the second embodiment. As illustrated in FIG. 8, the image merge device 200 is further provided with a merge rate calculation unit 210 in addition to the units included in the image merge device 100.

The merge rate calculation unit 210 calculates a merge rate of a plurality of images in a superimposed area for each pixel or area, and the merge unit 160 merges the images based on the calculated merge rate. The operations of other units has already been described.

Figure 9:
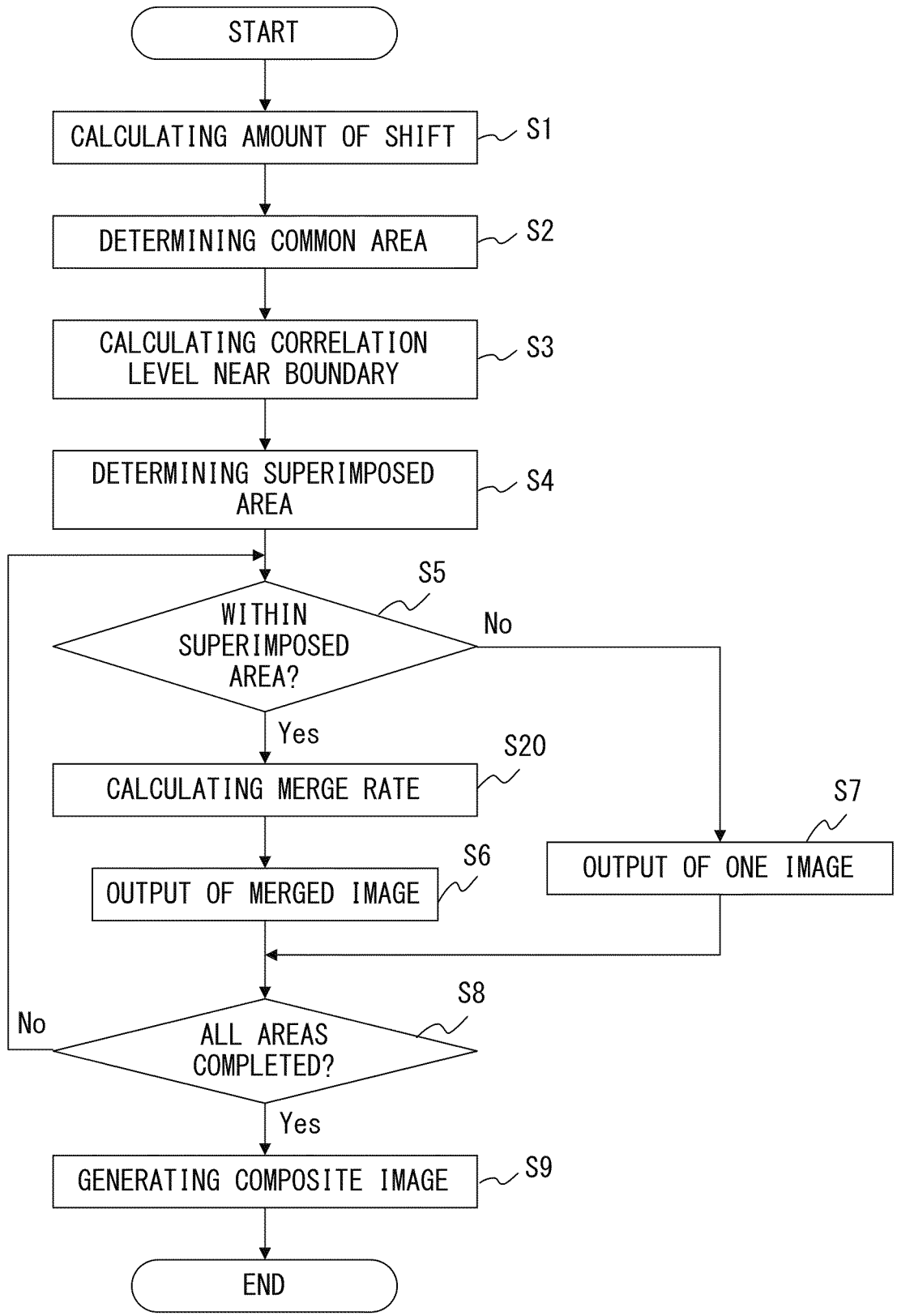
FIG. 9 is a flowchart of the process performed by the image merge device according to the second embodiment.

The flow of the process performed by the image merge device 200 is described below with reference to FIG. 9. As illustrated in FIG. 9, the image merge device 200 performs the process of calculating a merge rate in step S20 between steps S5 and S6. Other processes are similar to those performed by the image merge device 100.

The calculation of the merge rate by the merge rate calculation unit 210 is described below. First, the case in which a merge rate is changed depending on the distance from the boundary is described below with reference to FIG. 10. For simple explanation, it is assumed that horizontally shifted images P1 and P2 are combined, but the case in which they are shifted from each other in a two-dimensional direction is basically the same. In FIG. 10, the image P2 is drawn smaller than the image P2 for simple explanation. However, the two images are in the same size.

FIG. 10 illustrates an example where images P1 and P2 are merged and the image P2 is used in the common area. In this case, as illustrated in FIG. 10, the boundary of the image P2 appears on the composite image. FIG. 10 also illustrates a graph indicating the relationship between the distance from the boundary of the image P2 and the merge rate. The horizontal axis of the graph in FIG. 10 indicates the distance from the boundary of the image P2, and the vertical axis indicates the merge rate. As illustrated in FIG. 10, at the boundary of the common area (boundary of the image P2), the merge rate of the image P1 is set as 1.0 (100 percent), and the merge rate of the image P2 is set as 0. Then, the merge rate of the image P1 is reduced from 1.0 to 0, and the merge rate of the image P2 is increased from 0 to 1.0 (100 percent) in the region starting from the boundary of the common area to the end of the superimposed area. Thus, the images P1 and P2 are smoothly merged in the merge area.

Contrary to the case illustrated in FIG. 10, the merge rate of the image P2 is 1.0 (100 percent), and the merge rate of the image P1 is 0 at the boundary of the common area (boundary of the image P1) when the image P1 is used in the common area. Then, the merge rate of the image P2 is reduced from 1.0 to 0, and the merge rate of the image P1 is increased from 0 to 1.0 as the distance from the boundary increases in the common area (not illustrated in the attached drawings).

The relationship between the size of the gap between images and the superimposition width is described below with reference to FIGS. 11A-11C and 12A-12C. FIGS. 11A, 11B, and 11C illustrate the vicinity of the boundary of the images P1 and P2 when the gap between the images is large. FIGS. 12A, 12B, and 12C illustrate the vicinity of the boundary when the gap between the images P1 and P2 is small.

As illustrated in FIG. 11A, when the gap between the images P1 and P2 is large, an outstandingly discontinuity occurs at the boundary when the images P1 and P2 are merged. In this case, unless the superimposition width is sufficiently large, the discontinuity near the boundary is outstanding although the images P1 and P2 are superimposed while changing the merge rate as illustrated in FIG. 11B. When the superimposition width is sufficiently large, the discontinuity near the boundary is hardly outstanding as a result of superposing the images P1 and P2 while changing the merge rate as illustrated in FIG. 11C.

On the other hand, as illustrated in FIG. 12A, when the gap between the images P1 and P2 is small, the discontinuity occurs at the boundary when the images P1 and P2 are merged, but it is not outstanding. In this case, even though the superimposition width is small, the discontinuity near the boundary is hardly outstanding as a result of superimposing the images P1 and P2 while changing the merge rate as illustrated in FIG. 12B. When the superimposition width is large, the discontinuity near the boundary is furthermore hardly outstanding as a result of superimposing the images P1 and P2 while changing the merge rate as illustrated in FIG. 12C. However, there is no conspicuous different between FIGS. 12B and 12C. In this case, avoiding the ghosts is highly considered more than the suppressing the discontinuity. Therefore, it is sometimes preferable to select a small superimposition width in place of a large superimposition width.

Figure 13A:
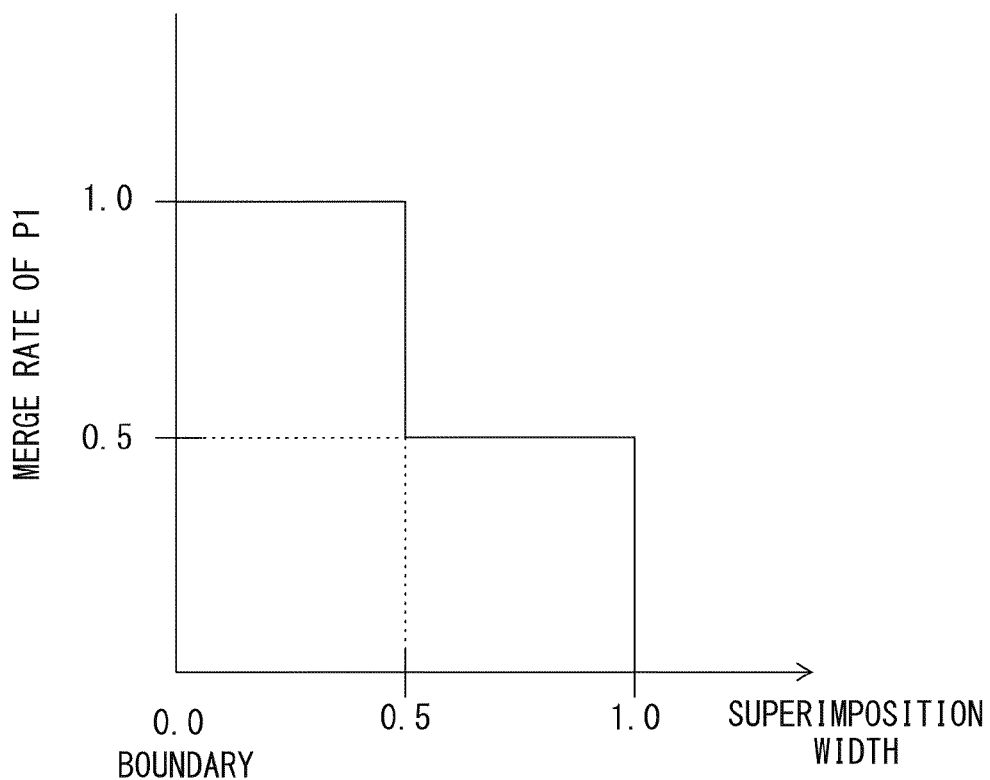
FIGS. 13A and 13B are explanatory views of the case in which the merge rate is changed in a superimposition range for each area.
Figure 13B:
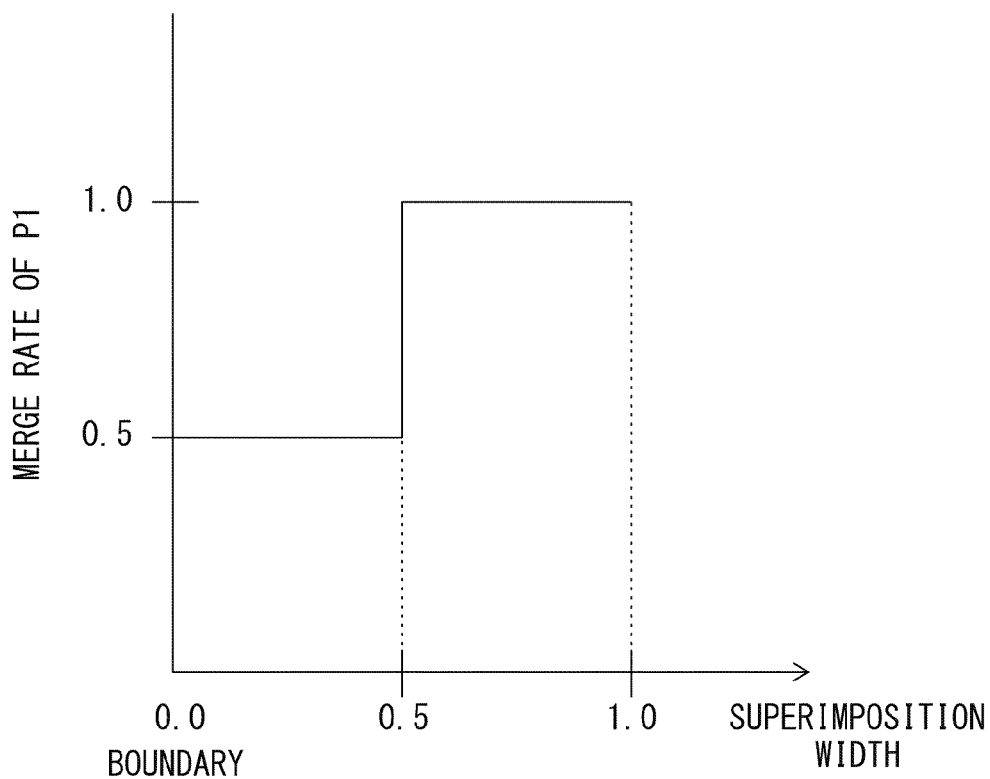

Next, a method in which the merge rate in the superimposition range is changed for each area is described with reference to FIGS. 13A and 13B. FIGS. 13A and 13B illustrate the exemplary cases in which the superimposition range is divided into two areas at the center of the superimposition area. The horizontal axes in the graph in FIGS. 13A and 13B indicate the distances from the boundaries of the common area, and the vertical axes indicate the merge rates. When the image P2 is used in the common area, the boundary of the image P2 appears on the composite image. In this case, as illustrated in FIG. 13A, the merge rates of the images P1 and P2 are respectively set as 1.0 (100 percent) and 0 from the boundary of the common area (boundary of the image P2) to the point immediately before the center of the superimposition area, and the merge rates of the images P1 and P2 are respectively set as 0.5 (50 percent) and 0.5 (50 percent) from the center of the superimposition area to the point immediately before the end of the superimposition area. Finally, the merge rates of the images P1 and P2 are respectively set as 0 and 1.0 (100 percent) at the end of the superimposition area.

On the other hand, when the image P1 is used in the common area, the boundary of the image P1 appears on the composite image. In this case, as illustrated in FIG. 13B, contrary to the case illustrated in FIG. 13A, the merge rate of the image P2 stepwise changes from 1.0 (100 percent) to 0 through 0.5 (50 percent) from the boundary of the common area (boundary of the image P2) to the end of the superimposition width, and the merge rate of the image P1 stepwise changes from 0 to 1.0 through 0.5.

Thus, the images P1 and P2 may be merged smoothly in the merge area by the merge unit 160 superimposing the images P1 and P2 while stepwise changing the merge rate for each area. In this case, the process is simpler than in the case in which the merge rate is changed for each pixel as described above, thereby reducing the load on the processing device.

The image merge device according to the third embodiment is described. An image merge device 300 according to the third embodiment has the function of converting as necessary both or one of the images P1 and P2 before merging the images in addition to the functions of the image merge device 100 according to the first embodiment.

FIG. 14 is a configuration of the image merge device 300 according to the third embodiment. As illustrated in FIG. 14, the image merge device 300 is provided with an image conversion unit 310 in addition to the units of the image merge device 100.

The image conversion unit 310 converts both or one of the images to reduce the gap between the images when the correlation level is small, that is, when the gap between the images is large. Then, the correlation calculation unit 130 calculates the correlation level between the images.

Figure 15:
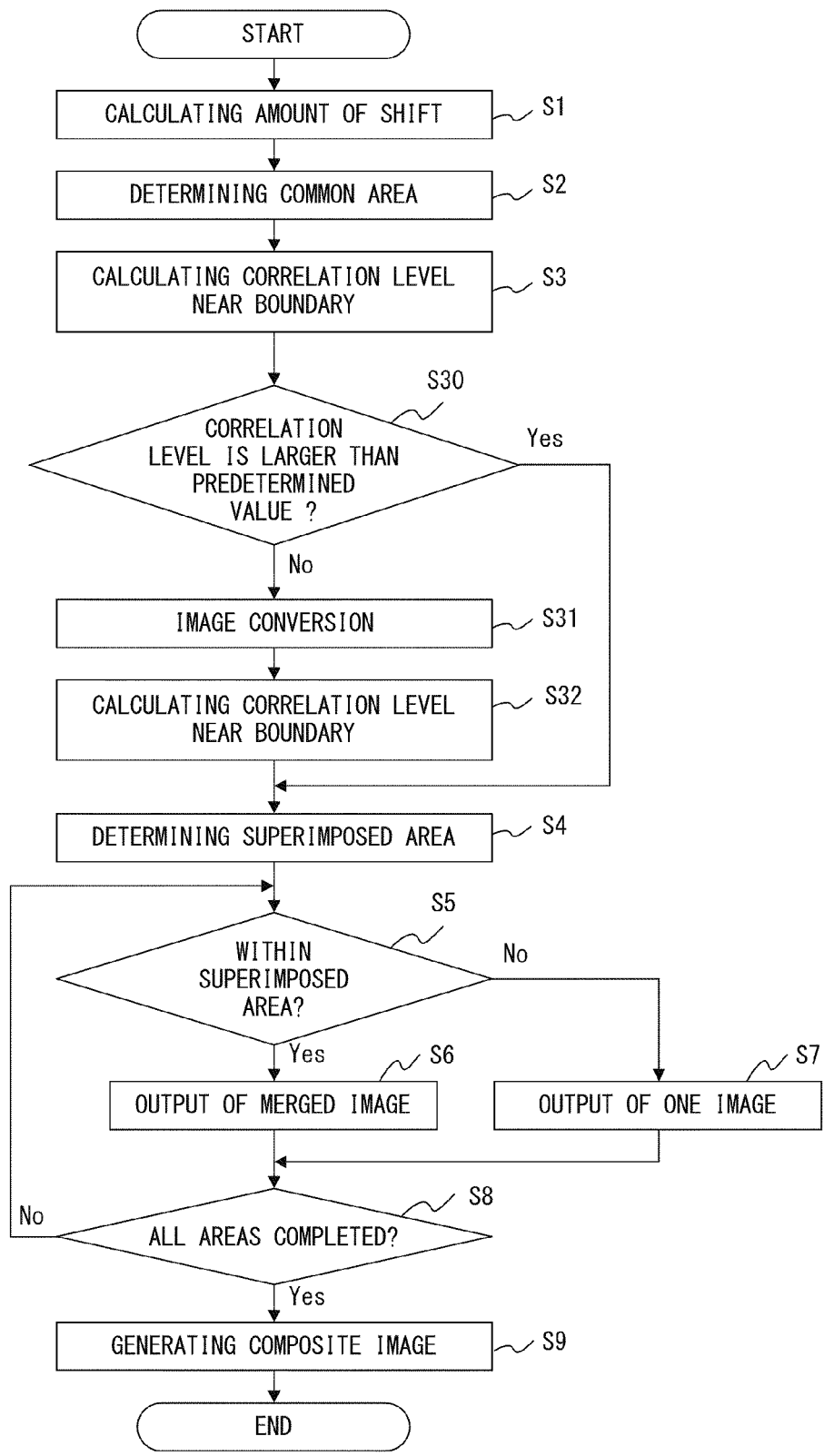
FIG. 15 is a flowchart of the process performed by the image merge device according to the third embodiment.

The flow of the process performed by the image merge device 300 is described below with reference to FIG. 15. As illustrated in FIG. 15, the image merge device 300 performs the processes in steps S30 through S32 between steps S3 and S4. Described below are steps S30 through S32.

In step S3, when the correlation calculation unit 130 calculates the correlation level, the image conversion unit 310 compares the correlation level with a predetermined value (step S30). When the correlation level is lower than the predetermined value, that is, when the gap between the images is large (NO in step S30), the image conversion unit 310 converts both or one of the plurality of images to reduce the gap between the images (step S31).

When the correlation level is higher than the predetermined value (YES in step S30), the image conversion unit 310 does not convert the image and the correlation level is fed to the superimposed area determination unit 140, then the processes in and after step S4 are performed.

When the image conversion is performed in step S31, the correlation calculation unit 130 calculates the correlation level of the converted images (step S32). The calculated correlation level is output to the superimposed area determination unit 140, and the processes in and after step S4 are performed.

After step S32, control may be returned to step S30. In this case, the image conversion unit 310 repeats the image conversion process until the correlation level becomes smaller than the predetermined value (not illustrated in the attached drawings). Other processes are similar to those performed by the image merge device 100.

Described below is the image conversion by the image conversion unit 310. The image conversion unit 310 determines that the gap between the images is large when the correlation level is smaller than a predetermined value, and converts at least one of the images so that the gap between the images is reduced. The conversion process may be performed on the entire image, or on the area near the boundary. The conversion process may be performed on both or one of the two images to be merged. When the vicinity of the boundary is converted, one side or both sides of the boundary may be converted.

Figure 16:
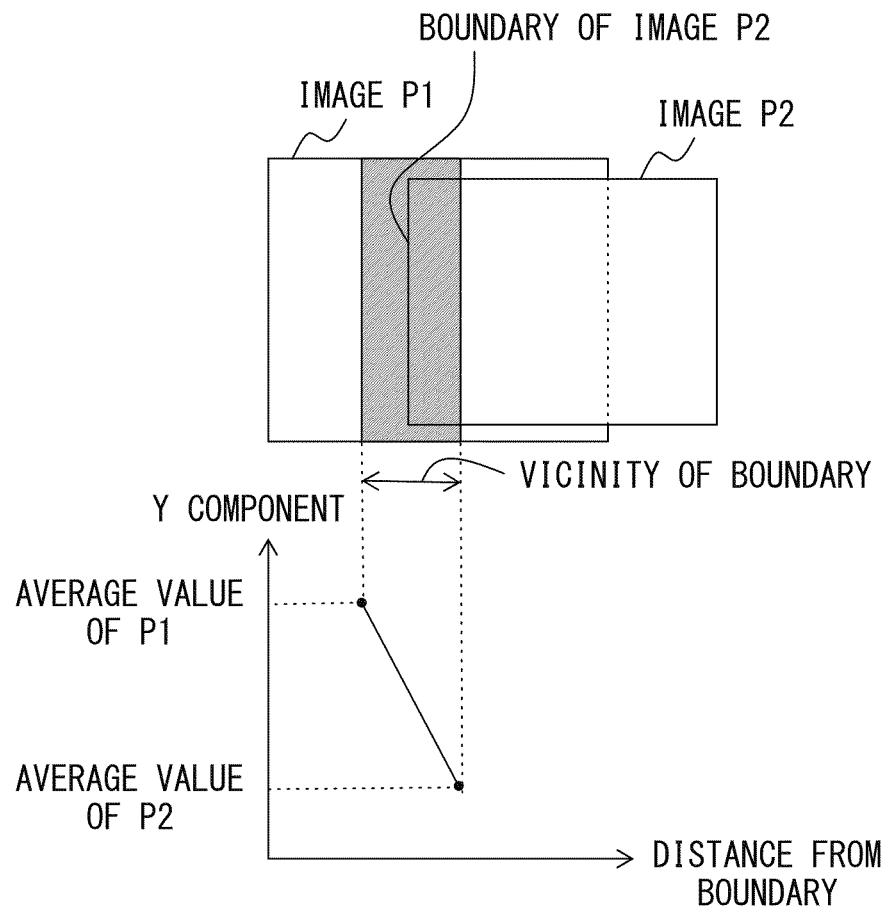
FIG. 16 is an explanatory view of the area near the boundary where a conversion is performed.

The area to be converted when a conversion is made to the vicinity of the boundary is described with reference to FIG. 16. For simple explanation, it is assumed that the images P1 and P2 are shifted from each other in the horizontal direction. The similar method may be applied to the case where the images are shifted in the two-dimensional direction. In FIG. 16, the image P2 is drawn smaller than the image P1 only for convenience in explanation, but the two images may be the same size.

FIG. 16 illustrates a case where the images P1 and P2 merged and the image P2 is used in the common area. FIG. 16 also illustrates a graph indicating the relationship between the distance from the boundary of the image P2 and the merge rate. The horizontal axis of the graph in FIG. 16 indicates the distance from the boundary of the image P2, and the vertical axis indicates the Y component. As illustrated in FIG. 16, the area in which images are converted is within a predetermined distance from the boundary. The conversion area may be the same as the area for which the correlation level is calculated, but the conversion area may be larger than the area. In addition, the conversion area may be larger than the superimposed area. Depending on the size of the image, the conversion area may be several percent through several tens of percent of the width of the entire image.

Described below is an example of the case in which an image is converted based on the brightness. In this example, the YCbCr color space or the YPbPr color space is used as an example. In these color spaces, the brightness is expressed by the Y component.

Assuming that the an average value of the Y component of the image P1 near the boundary is higher than the average value of the Y component of the image P2 (that is, the image P1 is brighter than image P2), the image conversion unit 310 reduces the brightness of the image P1 in the vicinity of the boundary, and on the other hand, increases the brightness of the image P2 in the vicinity of the boundary. As a result, as illustrated in FIG. 15, the brightness is gradually reduced within the conversion area from the image P1 to the image P2.

Figure 17:
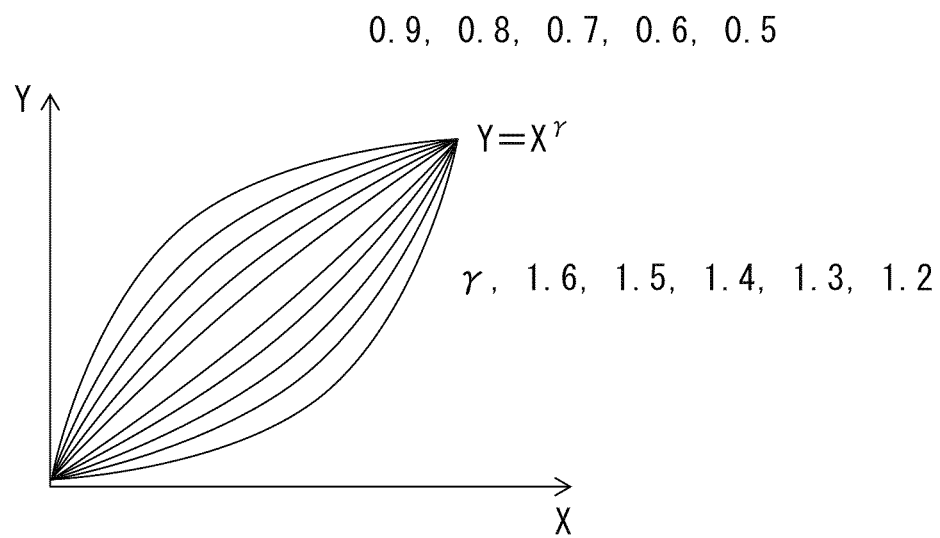
FIG. 17 is an example of a gamma correction curve.

Described below is the image conversion by the image conversion unit 310. When images are converted according to Y component, the image conversion unit 310 may be provided with a plurality of gamma correction curves illustrated in FIG. 17 and a correspondence table of the difference of the Y component and the gamma correction curves illustrated in FIG. 18. The image conversion unit 310 calculates the difference between the average value of the Y component of the image P1 and the average value of the Y component of the image P2 when the correlation level calculated by the correlation calculation unit 130 is lower than a predetermined value. Then the image conversion unit 310 selects the gamma correction curve corresponding to the difference from the plurality of gamma correction curves illustrated in FIG. 17 based on the correspondence table illustrated in FIG. 18. When there is no curve corresponding to the difference, the image conversion unit 310 may generate a curve corresponding to the difference with reference to FIGS. 17 and 18. Then, the image conversion unit 310 converts both or one of the images P1 and P2 according to the selected gamma correction curve. Afterward, the image conversion unit 310 outputs again the image P1 and/or the image P2 after the image conversion to the correlation calculation unit 130. The correlation calculation unit 130 calculates the correlation level on the converted images P1 and P2, and the superimposed area determination unit 140 determines the superimposition width based on the correlation level.

The image conversion unit 310 may repeatedly perform the image conversion until the correlation level between the images exceeds a predetermined value. In this case, the correlation calculation unit 130 calculates the correlation level on the images P1 and P2, and returns the correlation level to the image conversion unit 310. Then the image conversion unit 310 compares the correlation level with the predetermined value to decide whether further conversion is necessary.

FIGS. 11A through 11C and 12A through 12C illustrate the vicinity of the boundary when the images P1 and P2 are converted so that the gap between the images is reduced. For example, FIG. 11A illustrates the vicinity of the boundary in the case in which the image P2 is rather darker than the image P1. In this case, an outstanding discontinuity occurs at the boundary. FIG. 11B illustrates an example where the image P2 is corrected to be slightly brighter, and the image P1 is corrected to be slightly darker. With the effect of the small superimposition width, the discontinuity that has occurred at the boundary still remains. FIG. 11C illustrates a result of correcting the image P2 to be further brighter, and correcting the image P1 to be further darker. According to this process, with the effect of the expanded superimposition width, the discontinuity that has occurred at the boundary is hardly recognized.

FIGS. 12A through 12C illustrate a result of performing a similar conversion as in FIG. 11A through 11C when the gap between the images is much smaller than the case in FIG. 11A through 11C. In this case, as illustrated in FIG. 12B, since the discontinuity at the boundary becomes inconspicuous by one conversion process, the second image conversion process as illustrated in FIG. 11C may be omitted.

Next, the case in which a number of images are merged is described with reference to FIG. 19. FIG. 19 illustrates the superimposed areas when four images are merged, and the brightness of the right images compared with the respective left images. In this figure, the superimposition widths have nearly equal widths for each boundary, but it is obvious that the superimposition width may be appropriately changed depending on the correlation level of the images.

For example, when a plurality of images are continuously shot, the brightness of the entire image may be different for each image due to a change of the position of a light source for the subject if the images are obtained indoors, and due to a change of the shape of cloud and so on if the images are obtained outdoors. In FIG. 19, the second image is brighter than the first image, and the third image is further brighter than the second image. In this case, if it is assumed that the image conversion unit 310 converts the entire image so that the gap between the images is reduced, then the conversion to brighten the images continues. As a result, as the second image, the third image, and the subsequent images in the rightward direction, the images become gradually whitened.

However, as illustrated in FIG. 19, if the area in which a conversion is made is limited to the vicinity of the boundary, then the discontinuity near the boundary may be inconspicuous while avoiding the above-mentioned problem.

The image merge devices 100, 200, and 300 according to the embodiments may be realized in various configurations. Described below are the implementations of the image merge devices 100, 200, and 300.

The image merge devices 100, 200, and 300 may be realized by using a computer. The computer (not illustrated in the attached drawings) includes at least a CPU (central processing unit processor), a memory, and an input/output interface. These components are interconnected via a bus. The input/output interface may be, for example, a LCD panel, a touchscreen panel, various buttons, dials, etc.

To realize the image merge devices 100, 200, and 300 by using a computer, a program used to direct a processor to perform a method illustrated by the above flowcharts is stored in the memory. Then, the processor executes the program using the memory, thereby realizing the image merge devices 100, 200, and 300.

Furthermore, the image merge device may be implemented on various devices. For example, the image merge device may be implemented on an image shooting device such as a still camera, video camera, and so on.

For example, the case in which the image merge device is implemented on an image shooting device is described below. An image shooting device is provided with a lens, an image pickup device, a controller (non-general-purpose processor), a display device, a memory, an input/output interface, and an auxiliary storage device in many cases. A lens forms an image of a subject on the image pickup device. The image pickup device converts the formed image into an electronic signal and output the signal to the controller. The controller controls the memory, the storage device, the interface, and the display device. The memory stores an image merge program to perform an image merge method illustrated by the above flowcharts. The controller reads the program from the memory, and executes the program, thereby realizing the image shooting device implemented with the image merge device.

A computer chip (microcontroller) for enabling various interfaces to perform an image merge method illustrated by the above flowcharts may be prepared. In this case, the computer chip controls each equipment unit of the image shooting device, thereby realizing the image shooting device with the image merge device.

In addition, the image shooting device with the image merge device may be realized by firmware to direct a processor to perform the image merge method. In this case, the firmware may be embedded in a memory of the image shooting device.

In addition, the image shooting device having the image merge devices 100, 200, and 300 may be implemented in a PDA (personal digital assistant), a personal computer, etc.

Described below is loading a program. A program used to direct a computer, an image shooting device, and a mobile telephone terminal, a PDA, etc. including an image shooting device to realize the function of the image merge device described according to the above-mentioned embodiments may be acquired in various methods.

For example, the program is stored in an external storage device connected to the device (including a processor) for realizing the image merge device so that the program is loaded to memory as necessary.

A computer-readable record medium may store the program in advance, and the program may be read by a device for realizing the image merge device from the record medium. The memory of the computer or an external storage device may temporarily store the program, and the stored program may be executed by the CPU of the computer.

The program may be stored by a storage device of a program server, and a device for realizing the image merge device may download the program through an input interface and a communication circuit. In this case, for example, the program server converts program data representing the above-mentioned program into a program data signal, and the converted program data signal is modulated using a modulator, thereby acquiring a transmission signal, and the transmission signal is output to the communication circuit. A device for receiving the program demodulates the transmission signal by using a demodulator, thereby acquiring a program data signal, and the program data signal is converted to the program data.

When the communication circuit (transmission medium) for connecting the computers is a digital circuit, the program data signal may be transmitted. The program data signal may be relayed by a computer of a communication service provider between a server computer for transmitting a program and a client computer for downloading the program.

The embodiments described above may be arbitrarily combined. Other changes that can be made based on the descriptions and the drawings by those skilled in the art correspond to the subject and the equivalents of the invention.

According to the embodiments of the invention, when a plurality of images are combined and merged, the correlation level indicating the level (degree) of the gap between the plurality of images in an area near the boundary of the images is calculated, and an area in which the plurality of images are superimposed is determined so that the boundary of the merged images is not conspicuous based on the correlation level. Thus, the discontinuity at the boundary of the images is suppressed and the ghosts are removed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. An image merge device which merges a first image and a second image, comprising:
    a common area determination unit configured to determine a common area between the first image and the second image;
    a correlation calculation unit configured to calculate a correlation level indicating a degree of a gap between the first image in the common area near a boundary of the first image and the second image and the second image in the common area near the boundary when the first image and the second image are aligned using the common area;
    a superimposed area determination unit configured to determine a superimposed area in which the first and second images are superimposed near the boundary based on the correlation level calculated by the correlation calculation unit; and
    a first image conversion unit configured to convert at least one of the first and second images in the superimposed area,
    wherein the correlation calculation unit acquires pixel value of pixels in the vicinity of the boundary from each of the first image and the second image, calculates first statistics of pixel value of the pixels from the vicinity of the boundary of the first image and second statistics of pixel value of the pixels from the vicinity of the boundary of the second image, and calculates the correlation level based on both the first statistics and the second statistics, the first and the second statistics are any of average, cumulative sum, standard deviation, and dispersion.

2. The image merge device according to claim 1, wherein the correlation calculation unit calculates the correlation level for area in the common area within a predetermined width from the boundary when the first and second images are aligned using the common area.

3. The image merge device according to claim 1, wherein the correlation calculation unit calculates the correlation level based on at least one of statistics of brightness, chroma, a color temperature, and a difference in pixel value.

4. The image merge device according to claim 1, wherein the superimposed area determination unit determines a size of the superimposed area based on the correlation level.

5. The image merge device according to claim 1, wherein the superimposed area determination unit broadens the superimposed area when the correlation level is low.

6. The image merge device according to claim 1, wherein the superimposed area determination unit narrows the superimposed area when the correlation level rises above a certain threshold.

7. The image merge device according to claim 1, wherein a maximum value and a minimum value of the superimposed area is assigned to the superimposed area determination unit.

8. The image merge device according to claim 7, wherein the maximum value and the minimum value is arbitrarily set.

9. The image merge device according to claim 1, wherein a merge rate of the first and second images in the superimposed area changes depending on a distance from the boundary.

10. The image merge device according to claim 1, further comprising
    a second image conversion unit configured to compare the correlation level with a predetermined value, and convert at least one of the first and second images based on a result of the comparison.

11. The image merge device according to claim 10, wherein the second image conversion unit converts at least one of the first and second images so that the correlation level after the conversion rises above a certain threshold.

12. The image merge device according to claim 10, wherein the second image conversion unit converts at least one of the first and second images so that a gap between images after the conversion falls below a certain threshold.

13. The image merge device according to claim 10, wherein the second image conversion unit converts the image in the vicinity of the boundary.

14. The image merge device according to claim 10, wherein
the second image conversion unit repeats the conversion process until the result of the comparison satisfies a predetermined condition.

15. The image merge device according to claim 1, further comprising
a shift amount calculation unit configure to calculate an amount of shift of the first and second images, wherein
the common area determination unit aligns the first and second images based on the amount of shift, and determines an area overlapping between the first and second images as the common area,
the boundary is an edge of the common area.

16. A non-transitory computer readable medium storing an image merge computer program for enabling a computer to perform an image merge method, the image merge method comprising:
determining a common area between the first image and the second image;
calculating a correlation level indicating a degree of a gap between the first image in the common area near a boundary of the first image and the second image and the second image in the common area near the boundary when the first image and the second image are aligned using the common area;
determining a superimposed area in which the first and second images are superimposed near the boundary based on the correlation level; and
converting at least one of the first and second images in the superimposed area,
wherein
the calculating the correlation level comprises acquiring pixel value of pixels in the vicinity of the boundary from each of the first image and the second image, calculating first statistics of pixel value of the pixels from the vicinity of the boundary of the first image and second statistics of pixel value of the pixels from the vicinity of the boundary of the second image, and calculating the correlation level based on both the first statistics and the second statistics, the first and the second statistics are any of average, cumulative sum, standard deviation, and dispersion.

17. An image merge method for merging a first image and a second image, comprising:
determining a common area between the first image and the second image;
calculating a correlation level indicating a degree of a gap between the first image in the common area near a boundary of the first image and the second image and the second image in the common area near the boundary when the first image and the second image are aligned using the common area;
determining a superimposed area in which the first and second images are superimposed near the boundary based on the correlation level; and
converting at least one of the first and second images in the superimposed area,
wherein
the calculating the correlation level comprises acquiring pixel value of pixels in the vicinity of the boundary from each of the first image and the second image, calculating first statistics of pixel value of the pixels from the vicinity of the boundary of the first image and second statistics of pixel value of the pixels from the vicinity of the boundary of the second image, and calculating the correlation level based on both the first statistics and the second statistics, the first and the second statistics are any of average, cumulative sum, standard deviation, and dispersion.

* * * * *